(No Model.) 2 Sheets—Sheet 2.
C. F. PRENTISS, L. G. STONE & H. FISHER.
SACKING ATTACHMENT FOR THRASHING MACHINES.
No. 336,665. Patented Feb. 23, 1886.
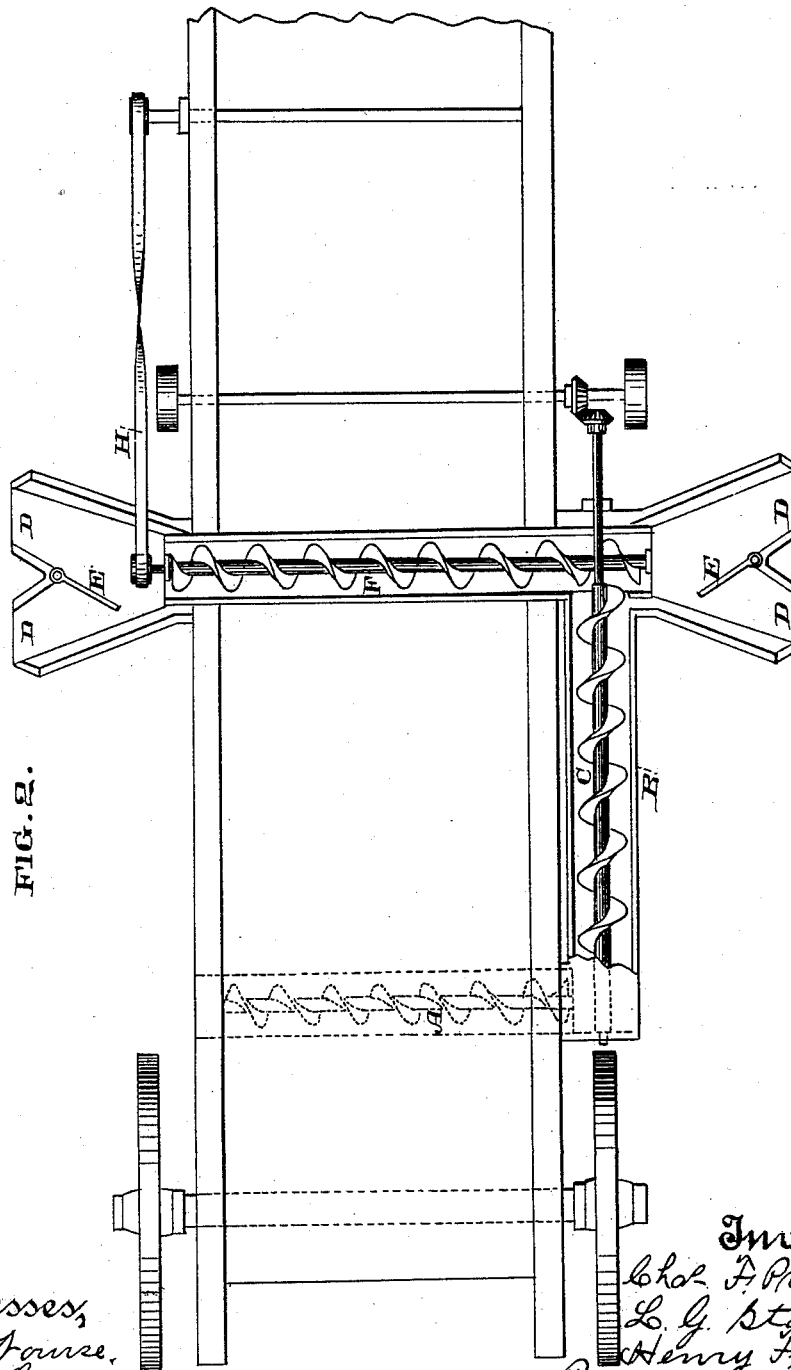

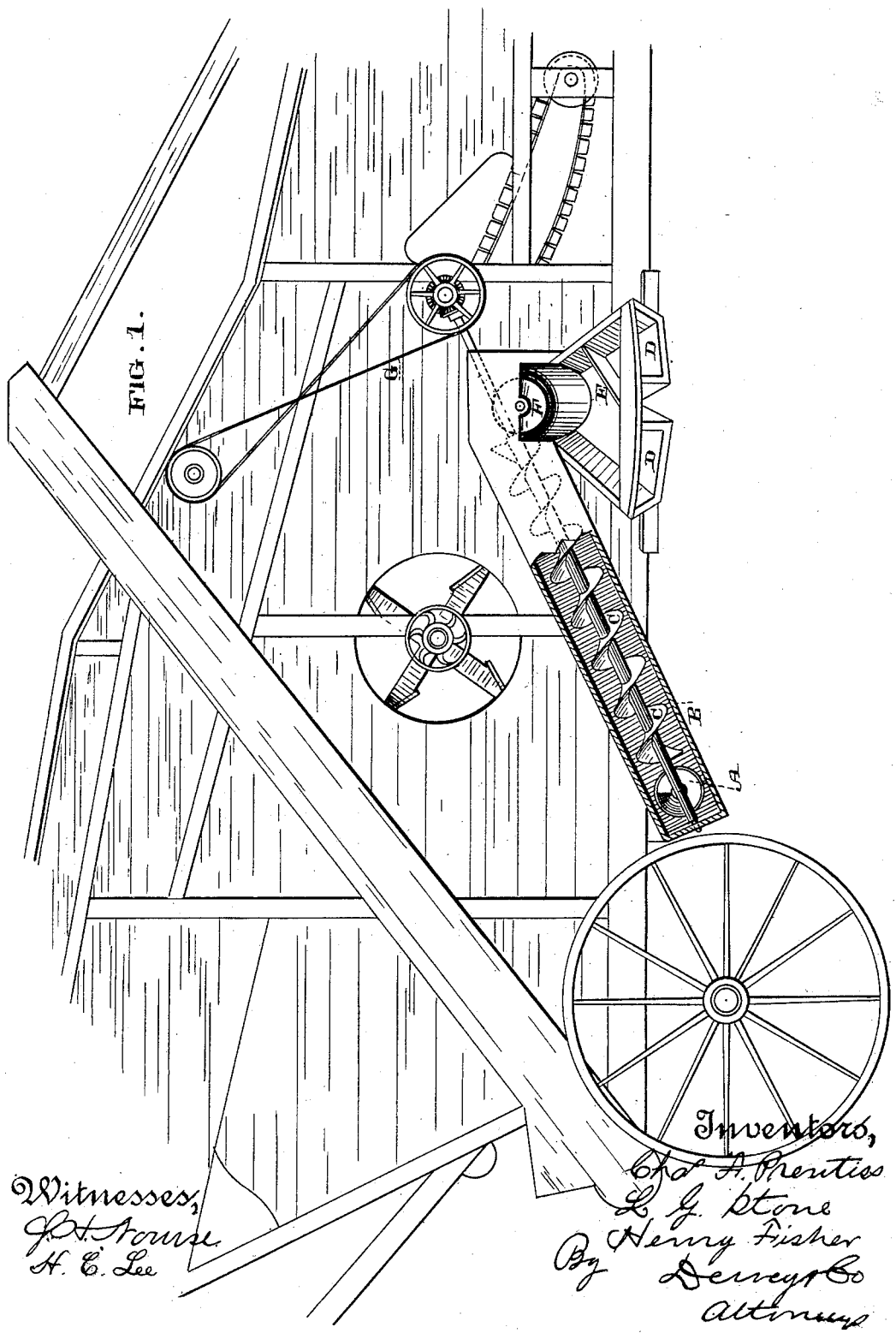

UNITED STATES PATENT OFFICE.

CHARLES F. PRENTISS, LYMAN G. STONE, AND HENRY FISHER, OF WOODLAND, CALIFORNIA.

SACKING ATTACHMENT FOR THRASHING-MACHINES.

SPECIFICATION forming part of Letters Patent No. 336,665, dated February 23, 1886.

Application filed July 11, 1885. Serial No. 171,367. (No model.)

*To all whom it may concern:*

Be it known that we, CHARLES FREDERIC PRENTISS, LYMAN GEORGE STONE, and HENRY FISHER, of the town of Woodland, Yolo county, State of California, have invented an improvement in Sacking Attachments for Thrashing-Machines; and we hereby declare the following to be a full, clear, and exact description of the same.

Our invention relates to a sacking attachment for thrashing-machines; and it consists in certain combinations of parts hereinafter more fully described, and pointed out in the claims.

Referring to the accompanying drawings for a more complete explanation of our invention, Figure 1 is a side elevation showing a portion of the thrashing-machine, a side view of the inclined elevated screw with part of its case broken away, and the sacking-spouts. Fig. 2 is a horizontal plan view of the devices and of so much of the thrashing-machine as is necessary to the understanding of our invention.

The grain when delivered from the cleaning-shoe of the thrashing-machine is usually received into a horizontal spout, through which it is carried to one side by a screw or auger which revolves within the spout, and as this spout is often too low for conveniently sacking the grain recourse is had to an elevator, by which it is raised and delivered into the sacking-spouts. In places where there are strong or prevailing winds it often brings the sacking attachments in such a position that the chaff and dirt from the machine are all blown to that side, making it very inconvenient for the sack tenders and sewers. It is often impossible to change the setting of the machine so as to overcome this objection.

In our invention the mechanism is so arranged that the grain may be delivered at either side of the machine, there being sacking spouts and attachments at both sides, either of which may be used at will.

A is an auger by which the grain is delivered to one side of a thrashing-machine. B is an inclined spout or trough into which the grain is delivered by the auger A, and C is an auger revolving within this inclined spout and carrying the grain up to a suitable elevation to deliver it into the double sacking-spout D D, which has a gate, E, so that the grain may be allowed to discharge through one of the spouts until the sack which is attached to it has been filled, when the gate may be moved so that the grain will discharge through the other spout into the sack which has been placed upon that side, thus giving time for the removal of the first sack. These have the ordinary arrangement for holding the sacks. F is a horizontal auger rotating within a spout which extends across from one side of the machine to the other. This auger is driven by pulleys and a belt from any suitable or convenient driving-shaft and pulley upon the machine, and the grain which is elevated by the inclined auger C is delivered into the spout of this auger near one side. In the present case I have shown the auger C upon the right side of the machine, and when the sacking is to be done upon that side the auger F will be caused to rotate in such a direction as to deliver the grain into the spouts D upon the right side. If, however, from the setting of the machine it is convenient to have the sacking done upon that side, the belt H, by which this auger is driven, may be crossed so as to reverse the motion of the horizontal auger F, or the motion of the auger may be reversed by other suitable devices. The grain which is delivered by the auger C into the spout of the auger F is then carried across to the opposite side of the machine, where it is delivered into sacking-spouts D, similar to those shown upon the opposite side of the machine. By this construction we are enabled to set the thrashing-machine in the most convenient position with reference to the stack and the engine, and at the same time the sacking may be done upon the side where it may be most conveniently and expeditiously attended to. By means of the inclined spout B and auger the grain is brought to a point nearer the front of the machine, and the sacking men are removed from the rear end of the machine, where the dust and chaff are discharged.

Having thus described our invention, what we claim as new, and desire to secure by Letters Patent, is—

1. The combination of the spout for receiving the grain from the cleaning-shoe, means for delivering this grain at one side of the separator, an inclined elevator by which the grain is raised to a suitable point to be delivered into sacks, a second horizontal spout into which the grain is delivered from the elevator, and a screw or auger by which the grain may be carried along this spout and delivered at either side of the machine, substantially as herein described.

2. The combination of a horizontal spout into which the grain is received from the cleaning-shoe of the separator, a screw or auger by which it is delivered at one side of the machine, an inclined elevator into which this grain is received and by which it is raised to a sufficient height for sacking, a second horizontal spout into which the grain is delivered from the elevator, and which extends across from one side to the other of the machine, sacking-spouts connected with each end, an auger or conveyer fitted within this horizontal spout, and mechanism by which it may be caused to rotate in either direction, so as to deliver the grain at one side or the other of the machine, substantially as herein described.

In witness whereof we have hereunto set our hands.

CHAS. F. PRENTISS.
LYMAN G. STONE.
HENRY FISHER.

Witnesses:
C. F. THOMAS,
M. DIGGS.